Nov. 15, 1960 A. C. WICKMAN 2,959,984
VARIABLE SPEED POWER TRANSMISSION MECHANISMS
Filed Jan. 30, 1958 4 Sheets-Sheet 1

Inventor
A.C.Wickman

Nov. 15, 1960 A. C. WICKMAN 2,959,984
VARIABLE SPEED POWER TRANSMISSION MECHANISMS
Filed Jan. 30, 1958 4 Sheets-Sheet 2

Inventor
A. C. Wickman
By Glascock Downing Seebold
Attys.

Nov. 15, 1960  A. C. WICKMAN  2,959,984
VARIABLE SPEED POWER TRANSMISSION MECHANISMS
Filed Jan. 30, 1958  4 Sheets-Sheet 4

Inventor
A. C. Wickman 2,959,984

VARIABLE SPEED POWER TRANSMISSION MECHANISMS

Axel C. Wickman, 14 S. Hibiscus Drive, Miami Beach, Fla.

Filed Jan. 30, 1958, Ser. No. 712,246

Claims priority, application Great Britain Feb. 7, 1957

7 Claims. (Cl. 74—688)

This invention has for its object to provide in a simple and convenient form a variable speed power transmission mechanism for use on a vehicle, and of the type including a hydraulic torque converter and an epicyclic mechanism.

A mechanism in accordance with the invention comprises essentially a hydraulic torque converter which includes two relatively rotatable turbine members, an epicyclic mechanism which includes two sun pinions respectively connected to the said turbine members, and a third sun pinion which is clutch controlled, a unidirectional clutch between one of the sun pinions and its associated turbine member, and a unidirectional brake between the reaction member and the housing of the torque converter, a planet pinion carrier formed on or secured to the output shaft of the epicyclic mechanism, and interengaging compound planet pinions co-operating with the sun pinions.

The invention also comprises a mechanism as defined in the preceding paragraph having in combination therewith certain additional means as herein described and defined by the appended claims.

Figure 1:
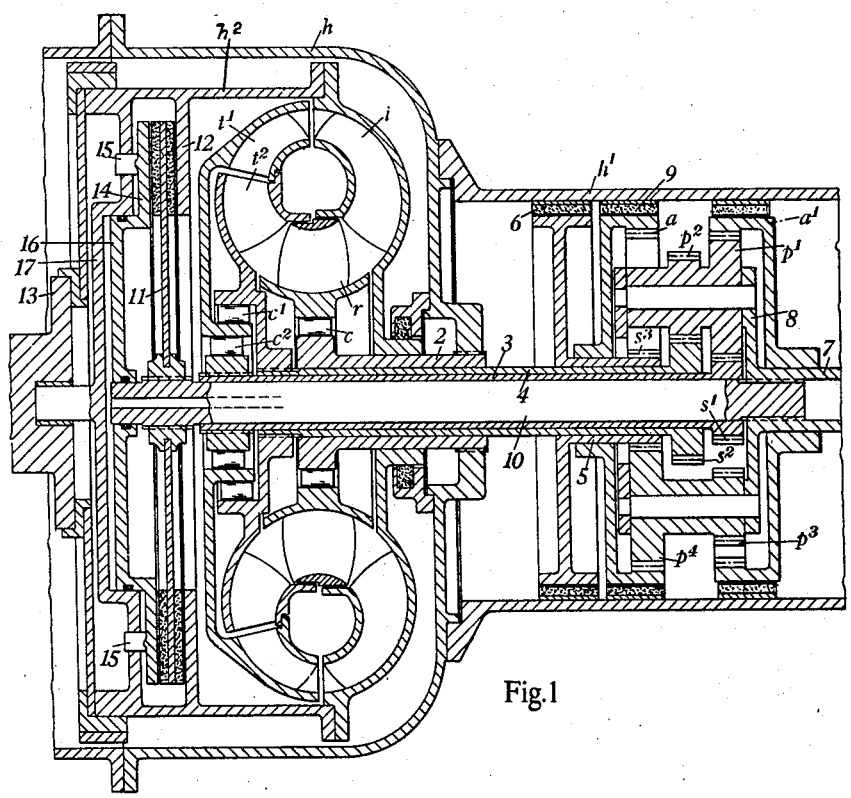
Figures 1, 2 and 3 are sectional elevations illustrating three typical embodiments of the invention.

In the example illustrated by Figure 1, the torque converter comprises an engine driven centrifugal pump or impeller $i$, a pair of concentric turbine members $t^1$, $t^2$, and a reaction member $r$ situated between the inner turbine member and the entrance end of the impeller. A unidirectional brake $c$ is provided between the reaction member and a hollow shaft 2 secured to the fixed housing $h$ of the torque converter. Alternatively the reaction member may be divided into two or three parts as in the construction illustrated by Figure 3, each having its own unidirectional brake between itself and the housing. A unidirectional clutch $c^1$ may also be provided between the two turbine members.

The outer turbine member $t^1$ is connected through a unidirectional clutch $c^2$ to a hollow shaft 3 on which is formed or secured a sun pinion $s^1$ forming part of the epicyclic mechanism. The inner turbine member $t^2$ is secured to a second hollow shaft 4, and on this shaft is formed or secured a second sun pinion $s^2$ of larger diameter than the pinion $s^1$. Alongside the said two sun pinions there is formed on or secured to another hollow shaft 5 a third or reaction sun pinion $s^3$, this shaft being connectible to the fixed housing $h^1$ of the epicyclic mechanism by a friction brake 6.

On the output shaft 7 of the epicyclic mechanism is formed or secured the planet pinion carrier 8, and on the latter are mounted two sets of interengaging compound planet pinions. The sun pinions and planet pinions are made of appropriately different diameters to provide the desired range of speed ratios. The planet pinions $p^1$, $p^2$, in the first set interconnect the two first mentioned sun pinions $s^1$, $s^2$, and the planet pinions $p^3$, $p^4$ in the second set interconnect the third sun pinion $s^3$ and either one or other of the planet pinions engaged with the first or second sun pinions $s^1$, $s^2$.

Alternatively the planet pinions $p^1$, $p^2$ interconnecting the two sun pinions $s^1$, $s^2$ may have combined with them a third planet pinion (not shown), the latter engaging with the planet pinion $p^4$ engaged with the third sun pinion $s^3$.

To obtain reverse rotation of the output shaft, there is provided a freely rotatable and internally toothed annulus $a$ in engagement with either of the pinions in the second set of planet pinions, the annulus being securable to the housing by a friction brake 9 when the third sun pinion $s^3$ is released. If desired, a second brake-controlled annulus $a^1$ may be included in engagement with the planet pinions which engage the first sun pinion $s^1$ for giving an additional low speed drive.

The brakes 6, 9 may be operated by any convenient hydraulic or other means conventionally employed with epicyclic power transmission mechanisms.

When it is required to be able to short circuit the torque converter and connect the engine directly to the output shaft, there is provided within the first mentioned hollow shaft 3 a shaft 10 which at one end is connected to the output shaft 7, the other end being connected to a friction clutch member 11 which is engageable with a complementary clutch member 12 associated with the engine-driven housing $h^2$ of the torque converter and a coupling 13 connected to the engine. The clutch member 11 is pressed into contact with the member 12 by a member 14 which is anchored to the engine-driven housing $h^2$ by, for example, pegs as 15 and is movable by fluid pressure on a piston 16 supported on the shaft 10 and contained in a cylinder 17 formed on the housing $h^2$. Alternatively the shaft 10 may be connected at one end directly to the engine driven housing $h^2$, the other end being connected to the output shaft through a friction clutch as in the construction illustrated by Figure 3.

The arrangement above described and illustrated by Figure 1 is such that when starting the vehicle, power is transmitted to the first sun pinion $s^1$ from the outer turbine member $t^1$. The inner turbine member $t^2$ is then rotated in the same direction as the outer turbine member but at a slower speed dependent on the ratio of the first and second sun pinions and their associated planet pinions. In this condition the speed ratio is determined by the first sun pinion $s^1$ and the third or reaction sun pinion $s^3$ or alternatively by the first sun pinion and the second annulus $a^1$ above mentioned. With increasing speed, the inner turbine member $t^2$ comes into action causing the first sun pinion $s^1$ to be rotated still in the same direction, but faster than the second sun pinion and over running the outer turbine member $t^1$, the speed ratio being then determined by the second and the third, or reaction, sun pinion, or alternatively by the second sun pinion and the second annulus above mentioned. With further increase of speed the torque converter reaches a condition in which its reaction member $r$ commences to rotate in the forward direction, and a speed ratio of substantially 1:1 in the torque converter is obtained. At this stage, or just prior to it, the third sun pinion $s^3$ (or the second annulus $a^1$) may be released and the output shaft 7 connected to the engine, so short circuiting the torque converter and epicyclic mechanism.

Reversal of motion of the output shaft 7 is effected by holding the first annulus $a$ above mentioned.

Figure 2:
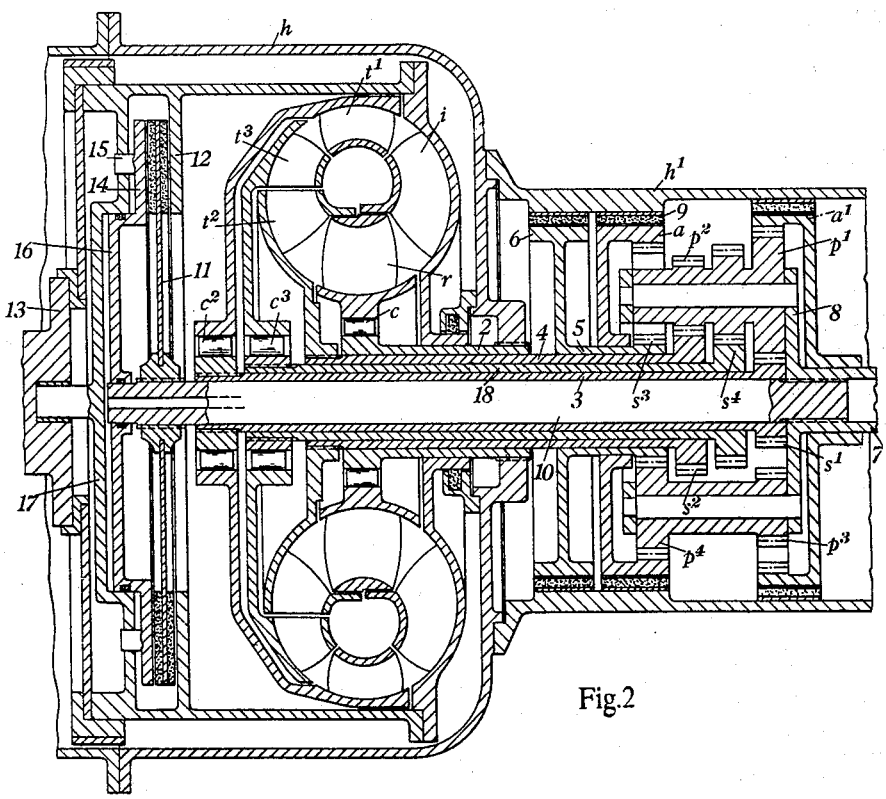

Whilst in the foregoing we have described a mechanism, and variants of certain detail features, which embodies the essential components of the invention, the invention is not restricted thereto, as the range of speed ratios obtainable may be extended by the addition of other components. Thus, as shown in Figure 2, an additional turbine member $t^3$ may be placed between the two turbine members $t^1$, $t^2$ above described. The additional turbine member has a connection through a unidirectional clutch $c^3$ with a hollow shaft 18, on which is formed or secured an additional sun pinion $s^4$ located between the two first mentioned sun pinions. Corresponding additional pinions are also provided on the first set of planet pinions. In other respects, the arrangement shown in Figure 2 is essentially similar to that shown in Figure 1.

Figure 3:
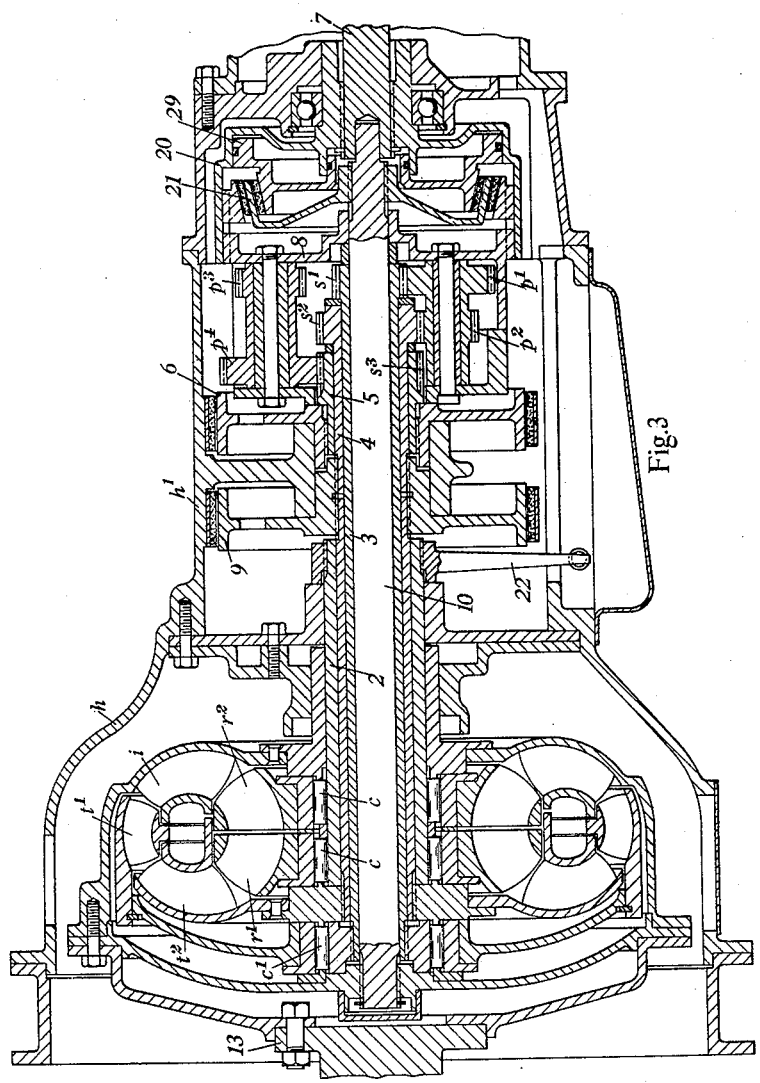

The example illustrated by Figure 3 is essentially similar to that shown in Figure 1, but differs in the following particulars:

For effecting a reverse drive of the output shaft 7, the annulus $a$ above mentioned is dispensed with, and instead the shaft 4 interconnecting the sun pinion $s^2$ and the turbine $t^2$ is divided into two parts, and these are interconnected at their adjacent ends by a member 9 forming part of a brake whereby the shaft 4 and the associated pinion $s^2$ can be frictionally engaged with the housing $h^1$. In this case, reversal of motion of the shaft 7 is effected by locking the sun pinion $s^2$ through the brake member 9.

Figure 4:
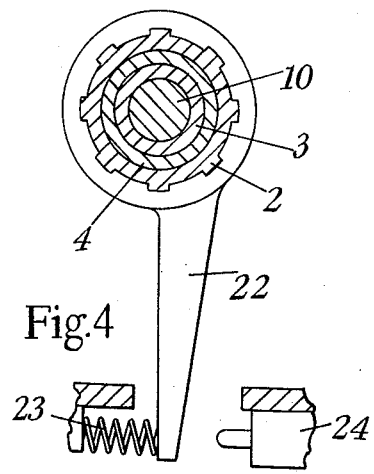
Figure 4 illustrates a detail feature of the arrangement shown in Figure 3.

To effect direct connection of the output shaft 7 with the engine driven shaft 10, the friction clutch comprising the parts 11, 12 in Figure 1 are dispensed with, and an equivalent clutch is provided between the adjacent ends of the said shafts 7, 10. On the shaft 7 is secured a friction clutch member 20 which can be engaged with a complementary clutch member 21, the latter being movable by a fluid operable piston 29 carried by a cylinder formed in the part 20. Further in the example shown in Figure 3, the reaction member may consist of two (or more) parts $r^1$, $r^2$, as previously mentioned, and each part is connectible to the shaft 2 through an associated unidirectional brake $c$. But instead of securing one end of the shaft directly to the housing $h$ as described with reference to Figure 1, there is secured to one end of it a torque arm 22. At one side of the free of this arm is arranged a compression spring 23 (Figure 4) and at the other side a valve 24 for controlling the motive fluid acting on the brake 6 which controls the sun pinion $s^3$, and also the clutch which interlocks the shafts 7 and 10. The arrangement is such that so long as a load is imposed on the reaction member or members $r^1$, $r^2$, the arm 22 is moved in the direction for compressing the spring 23. But when this load is decreased so far that the compressed spring can move the arm, the later is caused to open the valve 24, so releasing the brake 6 and also causing the shafts 7 and 10 to be interlocked. This latter action may be effected through the piston 16 of Figure 1, or by actuation of the member 21 in the clutch shown in Figure 3.

Figure 5:
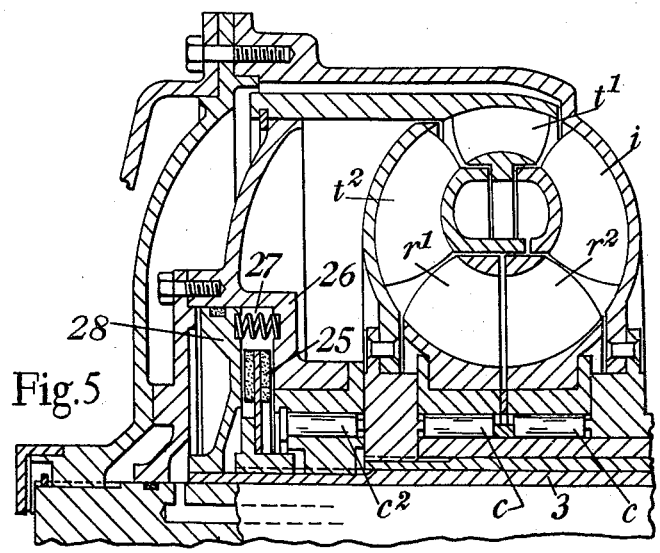
Figure 5 illustrates a further detail feature applicable to any of the arrangements shown in Figures 1, 2 and 3.

In the description of Figure 1, mention is made of an additional annulus $a^1$, for giving an additional low speed drive. As an alternative to this arrangement, when a low-gear engine braking condition is required, and the additional low-speed gear above mentioned is not required, the device illustrated by Figure 5 may be employed. This device serves to connect the turbine member $t^1$ directly to its associated sun pinion $s^1$, alternatively to the connection through the unidirectional clutch $c^2$, and it comprises a friction clutch member 25 secured to the shaft 3, and a complementary member 26 connected to the turbine $t^1$. The part 26 has combined with it a cylinder 27 containing a piston 28, which latter by the action of fluid pressure thereon can press the clutch member 25 into tight frictional engagement with the member 26, any convenient means being provided for controlling the pressure fluid.

Having thus described my invention what I claim as new and desire to secure by Letters Patent is:

1. A variable speed power transmission mechanism comprising in combination a hydraulic torque converter which includes a fixed housing, a driving impeller, two relatively rotatable turbine members arranged to be driven under the action of the impeller, and at least one reaction member, and an epicyclic mechanism which includes two sun pinions, means respectively connecting the sun pinions to the turbine members of the torque converter, a unidirectional clutch forming a part of the means connecting one of the sun pinions to one of the turbine members, a first set of compound planet pinions in engagement with and interconnecting the sun pinions, a third reaction sun pinion, a brake for releasably holding the reaction sun pinion against rotation, a second set of compound planet pinions through which the first set of compound planet pinions is connected to the reaction sun pinion, and a rotatable planet pinion carrier on which the first and second sets of compound planet pinions are mounted.

2. A power transmission mechanism according to claim 1, in which the torque converter includes a third turbine member arranged to be driven under the action of the impeller, and in which the epicyclic mechanism includes a fourth sun pinion in engagement with one of the planet pinions in the first set, the third turbine member being connected to the fourth sun pinion by means including an additional unidirectional clutch.

3. A power transmission mechanism according to claim 1, in which the epicyclic mechanism includes a freely rotatable and internally toothed annulus engaging one of the planet pinions in the second set, and another brake for releasably holding the annulus against rotation to reverse the direction of rotation of the planet pinion carrier.

4. A power transmission mechanism according to claim 1, in which the epicyclic mechanism includes a shaft forming the connecting means between one of the sun pinions and one of the turbine members of the torque converter, and a brake for holding the shaft against rotation to reverse the direction of rotation of the planet pinion carrier.

5. A power transmission mechanism according to claim 1, and having an output shaft rigid with the planet pinion carrier of the epicyclic mechanism, a second shaft connected to the output shaft, and a clutch for connecting the second shaft to the driving impeller of the torque converter.

6. A power transmission mechanism according to claim 1, and having an output shaft rigid with the planet pinion carrier of the epicyclic mechanism, an engine-driven shaft connected to said impeller, and a clutch for connecting the engine-driven shaft to the output shaft.

7. A power transmission mechanism according to claim 1, in which the means for connecting one of the turbine members of the torque converter to one of the sun pinions of the epicyclic mechanism comprises a shaft rigid with the sun pinion, and a clutch for directly connecting the turbine member to the shaft.

References Cited in the file of this patent

UNITED STATES PATENTS

| | | |
|---|---|---|
| 2,606,460 | Kelley | Aug. 12, 1952 |
| 2,623,411 | Herndon | Dec. 30, 1952 |
| 2,671,357 | Foley | Mar. 9, 1954 |
| 2,737,828 | Seybold | Mar. 13, 1956 |
| 2,762,238 | Baker | Sept. 11, 1956 |
| 2,797,594 | Grattan | July 2, 1957 |
| 2,861,474 | Moore | Nov. 25, 1958 |
| 2,883,881 | Baker | Apr. 28, 1959 |